United States Patent
Raux et al.

(10) Patent No.: US 10,613,915 B2
(45) Date of Patent: Apr. 7, 2020

(54) IDENTIFICATION OF USER INPUT WITHIN AN APPLICATION

(71) Applicant: Lenovo (Singapore) Pte. Ltd., Singapore (SG)

(72) Inventors: Antoine Roland Raux, Cupertino, CA (US); Akshay Chandrashekaran, Mountain View, CA (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 370 days.

(21) Appl. No.: 14/523,175

(22) Filed: Oct. 24, 2014

(65) Prior Publication Data
US 2016/0117208 A1    Apr. 28, 2016

(51) Int. Cl.
  *G06F 9/54*    (2006.01)
  *G06F 9/455*   (2018.01)
  *G06F 9/451*   (2018.01)

(52) U.S. Cl.
  CPC .......... *G06F 9/541* (2013.01); *G06F 9/45529* (2013.01); *G06F 9/451* (2018.02); *G06F 2209/542* (2013.01); *G06F 2209/545* (2013.01)

(58) Field of Classification Search
  CPC ................................. G06F 9/546; G06F 9/548
  See application file for complete search history.

(56) References Cited

U.S. PATENT DOCUMENTS

| | | | |
|---|---|---|---|
| 2003/0226102 A1* | 12/2003 | Allor | G06F 17/3089 715/205 |
| 2011/0202654 A1* | 8/2011 | Marquess et al. | 709/224 |
| 2012/0102392 A1* | 4/2012 | Reesman et al. | 715/243 |
| 2012/0226970 A1* | 9/2012 | Porter et al. | 715/234 |

* cited by examiner

*Primary Examiner* — Doon Y Chow
*Assistant Examiner* — Carina Yun
(74) *Attorney, Agent, or Firm* — Ference & Associates LLC

(57) ABSTRACT

One embodiment provides a method, comprising: embedding, using a processor, code within an application; detecting, at an electronic device, a user input within the application, wherein the user input selects an object within the application; receiving, using a processor, data associated with the selected object; and sending, using a processor, data associated with the selected object to an application selected from the group consisting of the application and another application. Other aspects are described and claimed.

20 Claims, 4 Drawing Sheets

IDENTIFICATION OF USER INPUT WITHIN AN APPLICATION

BACKGROUND

Certain electronic devices, e.g., desktop and laptop computers, offer a rich input environment such as a physical mouse and keyboard, as well as other input modalities, e.g., a camera for gaze tracking/eye inputs, microphones for voice inputs, etc. Other electronic devices come in different forms, e.g., more mobile forms such as a tablet computing device or a smart phone. Some of these mobile forms often lack one or more input devices, e.g., a physical keyboard and a mouse.

A user might desire to use more compact and mobile electronic devices, e.g., a tablet computer or a smart phone, with an application, e.g., a spreadsheet application, that was designed with a different form of electronic device in mind. Thus, a user might find that the application in question has enhanced use capabilities on a more traditional form factor, e.g., laptop or desktop computer, as compared to a mobile device version of the application. Even in cases where the application is fully realized in a mobile form, a user might still find difficulty in interacting with the application on certain mobile devices, e.g., a tablet computer, a smart phone, or the like. This results from the differences in the electronic devices, i.e., the different input environments offered by each.

BRIEF SUMMARY

In summary, one aspect provides a method, comprising: embedding, using a processor, code within an application; detecting, at an electronic device, a user input within the application, wherein the user input selects an object within the application; receiving, using a processor, data associated with the selected object; and sending, using a processor, data associated with the selected object to an application selected from the group consisting of the application and another application.

Another aspect provides an information handling device, comprising: a processor; a memory device that stores instructions executable by the processor to: embed code within an application; detect, at an electronic device, a user input within the application, wherein the user input selects an object within the application; receive data associated with the selected object; and send data associated with the selected object to an application selected from the group consisting of: the application and another application.

A further aspect provides a product, comprising: a storage device having code stored therewith, the code being executable by the processor and comprising: code that embeds, using a processor, code within an application; code that detects, at an electronic device, a user input within the application, wherein the user input selects an object within the application; code that receives, using a processor, data associated with the selected object; and code that sends, using a processor, data associated with the selected object to an application selected from the group consisting of: the application and another application.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
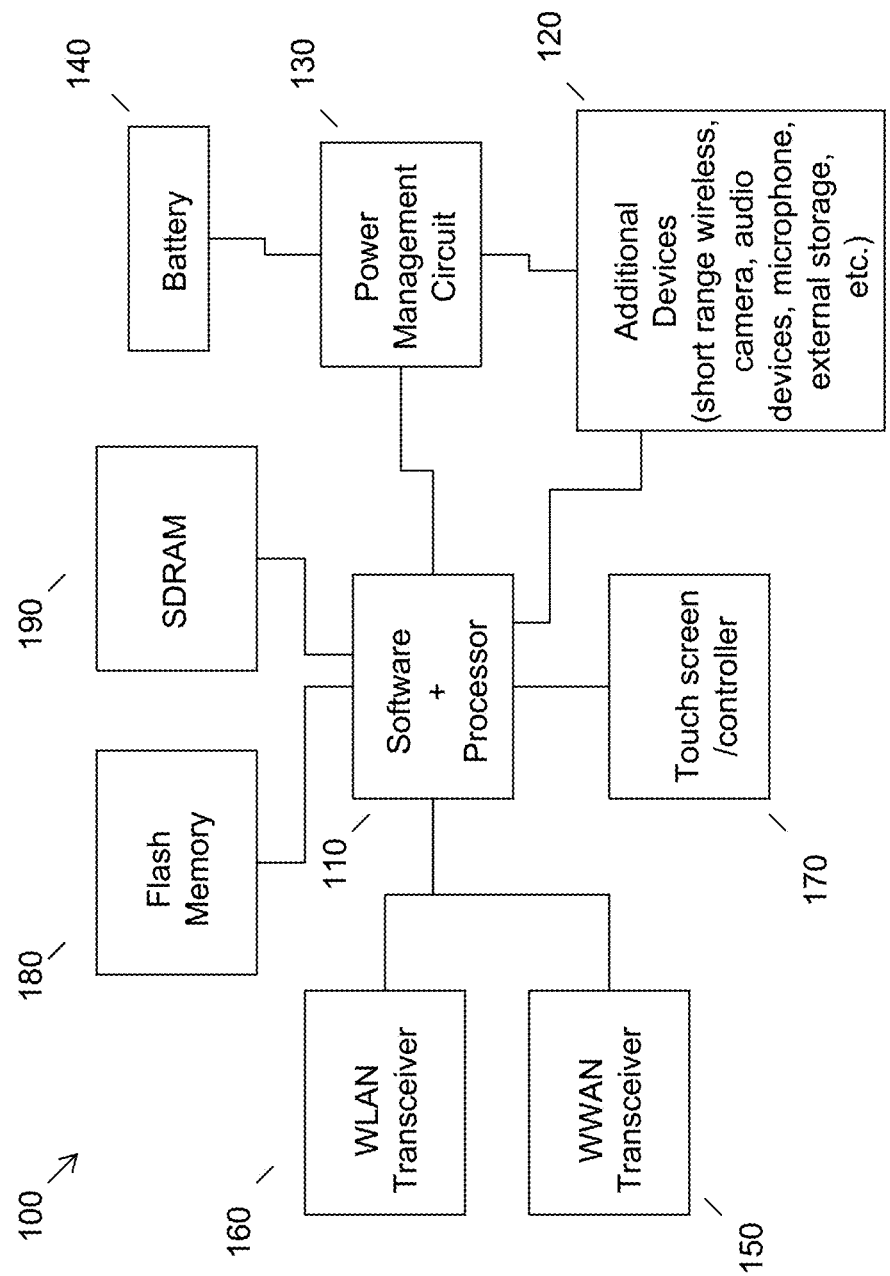
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Some devices (e.g., smart phone, tablet, personal computer, laptop, personal data assistant, etc.), may allow a user to interact with the device in a more natural way. For example, a user may be able to use both speech and touch to select an object within an application. In order to properly carry out the command of the user, the application may need to know what object the user has selected. For example, an application may have an embedded web page in which the user has selected an object using combined modalities.

One approach to determining the object the user has selected is to write or modify the code associated with the application. However, this can be both costly and risky. The application code may be extremely complex requiring a long development time and many resources. Additionally, when writing or modifying code associated with an application, bugs may be introduced. These bugs may affect the basic functionality of the application, meaning the application may not work properly or as intended.

Accordingly, an embodiment provides a method of identifying a user input within an application that relies on embedding code within the application, rather than modifying the source code associated with the application. One embodiment may receive an application and before loading the application may embed code within the application. When a user selects an object within the application, code associated with the object is sent to an application. In accordance with one embodiment, this application may be the application received or a second application. The code embedded within the application may allow an application to navigate back to the selected object. For example, the code may include tags to be associated with objects within the application. For example, an image within a web page may have a tag associated with it. As another example, a single word within an application may have an associated tag. Additionally or alternatively, the code may contain a hierarchy associated with the object. This hierarchy may allow an embodiment to determine the different levels of granularity that may be associated with a single object. For example, a word may be included within a sentence, which may be included within a paragraph, and so on.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, an audio input such as a microphone, and other devices which users may use to provide input to a device. System 100 often includes a touch screen 170 for data input and display/rendering. System 100 also typically includes various memory devices, for example flash memory 180 and SDRAM 190.

Figure 2:
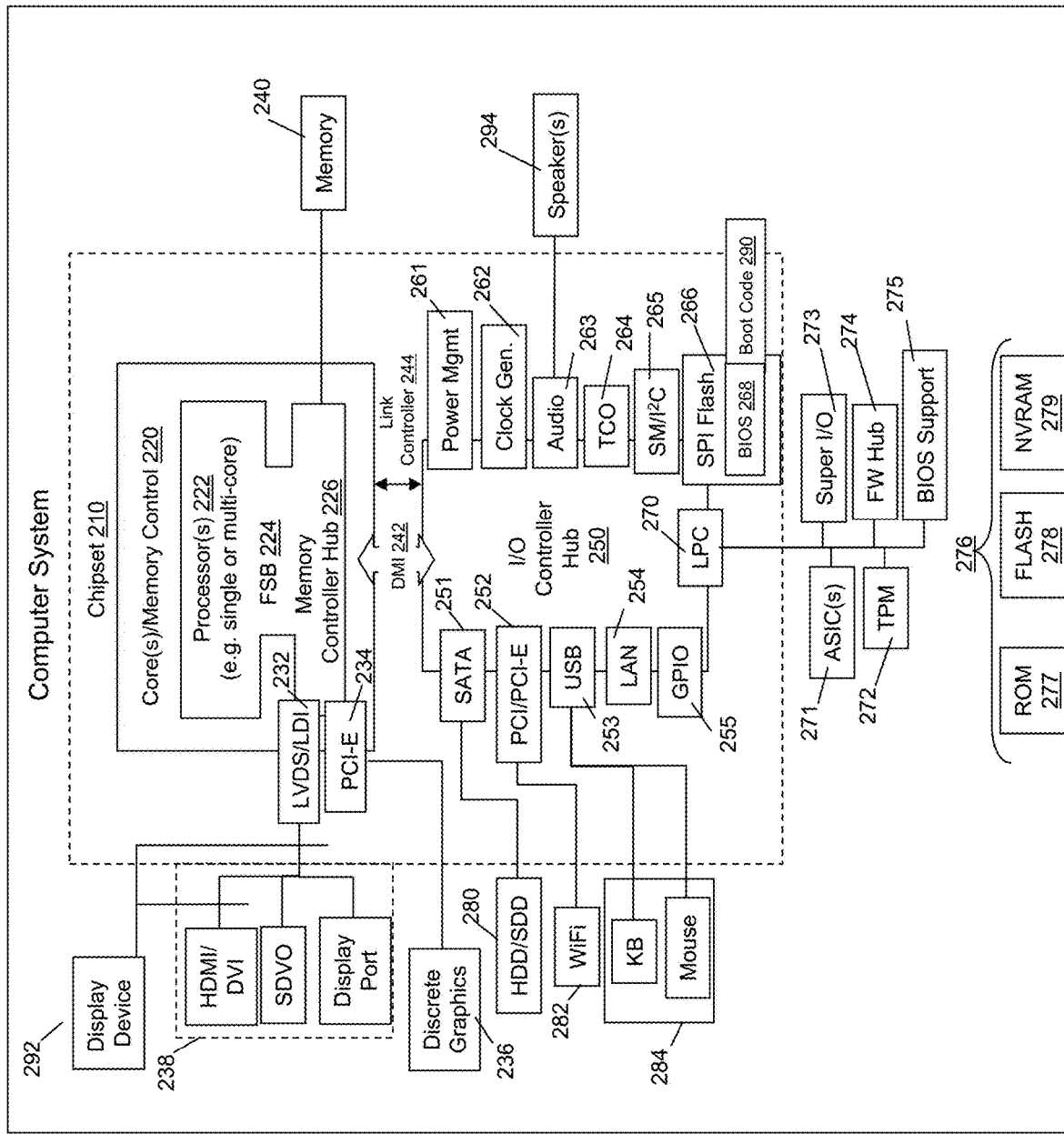
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which users may use when accessing an application and providing user input. For example, the circuitry outlined in FIG. 1 may be implemented in a tablet or smart phone embodiment, whereas the circuitry outlined in FIG. 2 may be implemented in a personal computer embodiment.

Figure 3:
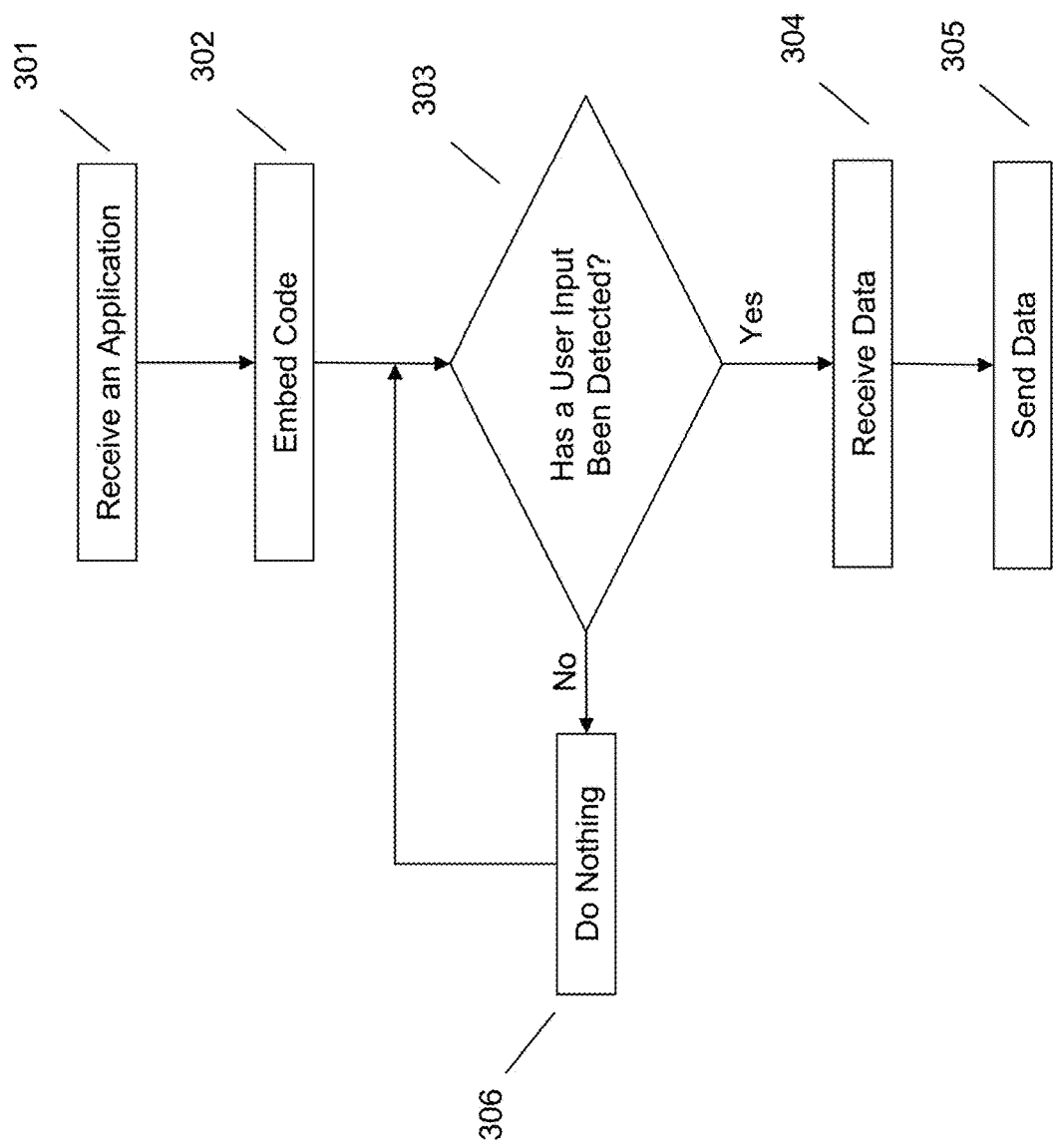
FIG. 3 illustrates an example method of identification of user input within an application.
Figure 4:
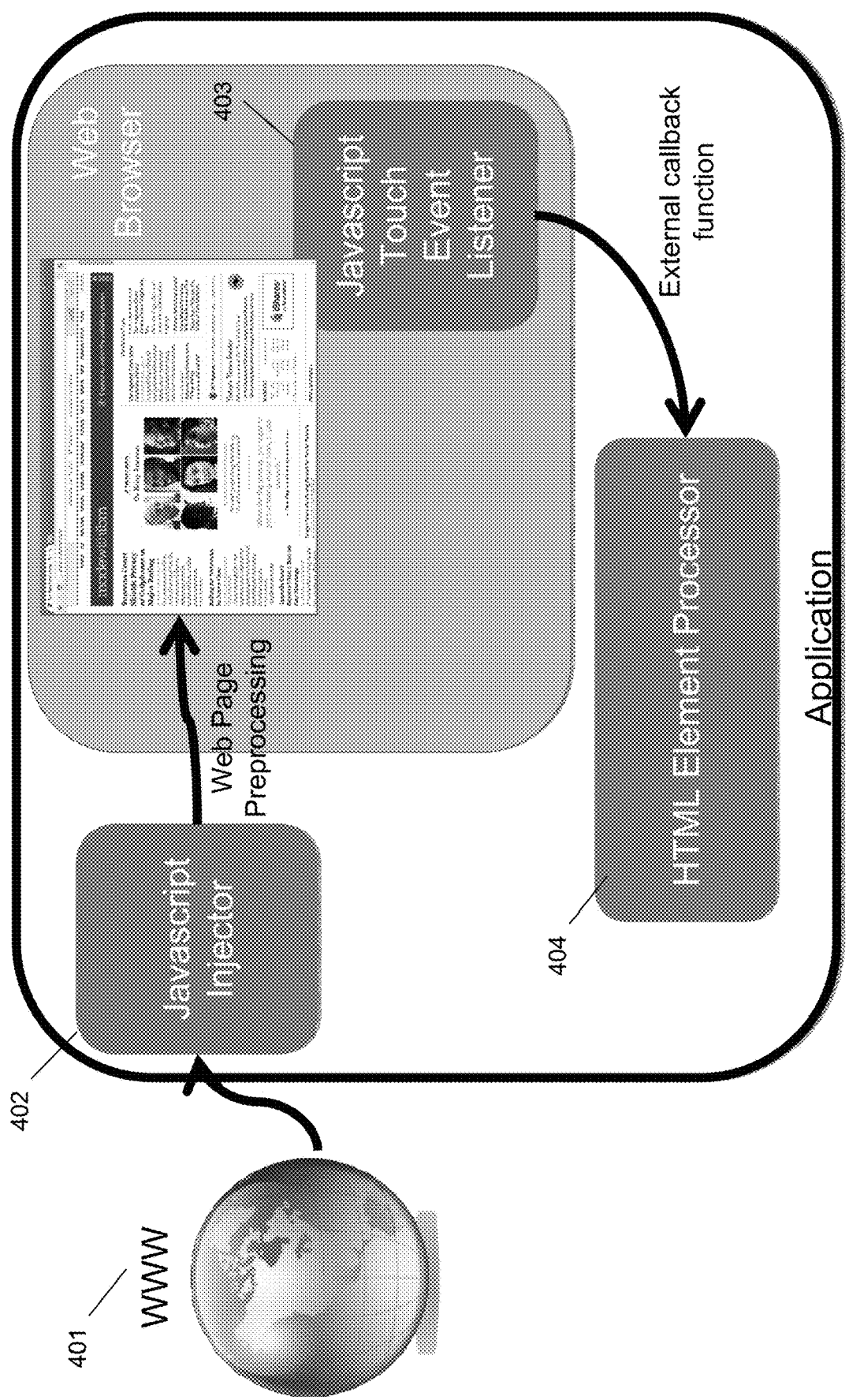
FIG. 4 illustrates an example application of using identification of user input within an application.

Referring now to FIG. 3, an embodiment may receive an application running on an electronic device at 301. For example, a user may open an application (e.g., a word processing program, a spreadsheet program, web browser, etc.). Alternatively, an embodiment may detect an application running on an electronic device. The application may, in one embodiment, be an application embedded within another application. For example, referring to FIG. 4, a user may open an application running an embedded web browser shown at 401. As an example, the main application (i.e., the application running the embedded application), may need to know which elements the user has selected within the embedded application. Referring back to FIG. 3, at 302, an embodiment may embed code within the application. The code injected may include a programming code which may allow an external call back function. For example, one embodiment may use JAVASCRIPT and may make use of hypertext markup language (HTML) tags. As another example, one embodiment may embed ACTIVEX components within a WINDOWS application. Other programming languages may be injected, for example, VISUAL BASIC. JAVASCRIPT is a registered trademark of Sun Microsystems, Inc. in the United States and other countries. ACTIVEX, WINDOWS, and VISUAL BASIC are registered trademarks of Microsoft Corporation in the United States and other countries.

In one embodiment, this embedding at 302 may include downloading the code associated with the application. An embodiment may then inject, for example using a JAVASCRIPT Injector 402, code into the application. For example, an embodiment may preprocess the code associated with the application and add invisible elements to the code. These invisible elements may allow an embodiment to detect user inputs, for example, touch, click, and the like, within the application. The invisible elements may be created following a standard programming language, for example, hypertext markup language (HTML). The invisible elements may identify standard programming tags, for example, indicating paragraph breaks, images, tables, headings, and the like. Additionally, these invisible elements may include identifying objects on a more granular level, for example, a particular word, a particular table element, and the like. These invisible elements, however, do not change the content of the application a visible way. In other words, a user may not see that the application has been modified.

The code injected may include information allowing an embodiment to navigate back to a particular object included in the application (e.g., an image, word, table, title, etc.). In one embodiment, the code may comprise a hierarchy associated with the object within the application. The hierarchy may describe a location of an object within the application. For example, a word is embedded within a sentence which is embedded within a paragraph and so on. The hierarchy may make use of the programming code used within the application. For example, an embodiment may use the level map associated with the application to identify such objects as paragraphs, images, headings, and the like. In addition, the hierarchy may make use of the invisible elements injected in the example embodiment above. This may allow an embodiment to navigate to a particular word or sentence, rather than an entire paragraph.

Additionally or alternatively, the code may comprise tags in one embodiment. These tags may be associated with a particular object within the application, thereby indicating a reference to a specific object. The tags may, in one embodiment, comprise a tag identifier, which may include an identification number or may include an identification word. These tags may be the tags used within the programming code of the application, for example, HTML tags, or may include user defined tags. The code may contain additional information assisting in identifying the object selected by the user. In addition, the code may contain a combination of information. For example, the tags and hierarchy may be used in combination to identify a particular object.

At 303, an embodiment may detect whether user input has been received within the application. The user input may include a user selecting an object within the application. For example, a user may open a web browser and touch an image and state "copy this." If an embodiment does not detect a user input at 303, it may do nothing at 306. An embodiment may then continue to wait for a user input at 303. Alternatively, an embodiment may return to 301 if a user opens a new application.

However, if an embodiment detects a user input at 303, the embodiment may receive data associated with the selected object at 304. This data may comprise information indicating where the object is located within the application, which may allow an application to navigate back to the object. For example, in one embodiment, this data may comprise the invisible element associated with the object selected by the user, if invisible elements were injected into the application. As another example, the data may contain the tag or hierarchy associated with the object selected by the user. Additionally or alternatively, the data may comprise the selected object. For example, rather than receiving the code associated with the object, an embodiment may receive the entirety of the object. For example, if a user clicks a word and states "copy this sentence", an embodiment may copy the words within the sentence rather than the tags, hierarchy, etc. associated with the sentence.

At 305, an embodiment may send data associated with the selected object to an application. For example, in one embodiment this data may comprise a call back function. The application that the data is sent to may be the application currently running, or may alternatively be another application. In one embodiment, the application the data is sent to may be the application running the embedded application. In other words, a user may select an object within an embedded application and the data associated with the object is sent to the application running the embedded application. As an example, referring to FIG. 4, a JAVASCRIPT Touch Event Listener 403, may receive the data at 304 and send the data to the application running the embedded web browser at 305. The application may use any programming language (e.g., C#, C++, VISUAL BASIC, etc.). In the example in FIG. 4, the application has an HTML element processor 404, to process the data, which, in this example, would comprise HTML or HTML tags.

The data sent may comprise the data associated with the selected object, for example the data received. Alternatively or additionally, the data sent may comprise data different from or distilled from the data received. For example, the data received may include a tag, hierarchy data, and tag identifier. However, the data sent may only include the hierarchy data or the data sent may include the selected object. The sent data may allow the application to navigate back to the selected object. For example, if a user selects a title within an article and indicates to an embodiment to email the title, an embodiment may send the data to the email application. This data may include any identifier allowing the email application to copy or navigate to the title.

Accordingly, as illustrated by the example embodiments and figures, an embodiment provides a method of identifying a user input within an application. One embodiment embeds code within an application. In one embodiment, this embedding may occur before the application is opened. This code may comprise tags, a hierarchy, or other invisible elements allowing an association of an object if selected by a user. An embodiment may then detect that a user has selected an object within the application and receive the data associated with the selected object. The data may include some type of identification of the object allowing either the copying of the object or the navigation back to the object. This data may include any of the information either injected during the preprocessing of the application or may include information already included in the code used to create the application. Once the data is received, an embodiment sends data, which may comprise the received data, to an application which may be the original application or a second application. Thus, an embodiment allows a user to select an object within an application, possibly using more than one modality of selection, and perform an action using that object, without writing new code or modifying the current code associated with the application.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    accessing code associated with an open application;
    embedding additional code within the open application, wherein the embedding comprises identifying, using the code associated with the open application, objects within the open application and adding identifiers that identify objects within the open application to the open application;
    detecting, at an electronic device, a user input, comprising input provided using more than one input modality, within the open application, wherein the user input selects an object within the open application;
    receiving data associated with the selected object, wherein the data associated with the selected object is based upon the additional code embedded within the open application and identifies the selected object; and
    sending data associated with the selected object to an application selected from the group consisting of the open application and another application.

2. The method of claim 1, wherein the open application is embedded within another application.

3. The method of claim 1, wherein the accessing code comprises downloading code associated with the open application and wherein the embedding comprises adding invisible elements to the code associated with the open application.

4. The method of claim 3, wherein the receiving comprises receiving an invisible element associated with the selected object.

5. The method of claim 1, wherein the code comprises tags, wherein the tags comprise a tag identifier associated with objects within the open application.

6. The method of claim 5, wherein the receiving comprises receiving a tag associated with the selected object.

7. The method of claim 1, wherein the code comprises a hierarchy associated with an object within the open application, wherein the hierarchy describes a location of an object within the open application.

8. The method of claim 7, wherein the receiving comprises receiving the hierarchy associated with the selected object.

9. The method of claim 1, wherein the data sent is selected from the group consisting of: hierarchy data, tag data, invisible element data, and the selected object.

10. The method of claim 1, wherein the open application is a web browser, and wherein the code comprises a programming language allowing external call back functions.

11. An information handling device, comprising:
a processor;
a memory device that stores instructions executable by the processor to:
access code associated with an open application;
embed additional code within the open application, wherein to embed comprises identifying, using the code associated with the open application, objects within the open application and add identifiers that identify objects within the open application to the open application;
detect, at an electronic device, a user input, comprising input provided using more than one input modality, within the open application, wherein the user input selects an object within the open application;
receive data associated with the selected object, wherein the data associated with the selected object is based upon the additional code embedded within the open application and identifies the selected object; and
send data associated with the selected object to an application selected from the group consisting of: the open application and another application.

12. The information handling device of claim 11, wherein the open application is embedded within another application.

13. The information handling device of claim 11, wherein to access code comprises downloading code associated with the open application and adding invisible elements to the code associated with the open application.

14. The information handling device of claim 13, wherein to receive comprises receiving an invisible element associated with the selected object.

15. The information handling device of claim 11, wherein the code comprises tags, wherein the tags comprise a tag identifier associated with objects within the open application.

16. The information handling device of claim 15, wherein to receive comprises receiving a tag associated with the selected object.

17. The information handling device of claim 11, wherein the code comprises a hierarchy associated with an object within the open application, wherein the hierarchy describes a location of an object within the open application.

18. The information handling device of claim 17, wherein to receive comprises receiving the hierarchy associated with the selected object.

19. The information handling device of claim 11, wherein the data sent is selected from the group consisting of: hierarchy data, tag data, invisible element data, and the selected object.

20. A product, comprising:
a storage device having code stored therewith, the code being executable by the processor and comprising:
code that accesses code associated with an open application;
code that embeds additional code within the open application, wherein the code that embeds comprises code that identifies, using the code associated with the open application, objects within the open application and code that adds identifiers that identify objects within the open application to the open application;
code that detects, at an electronic device, a user input, comprising input provided using more than one input modality, within the open application, wherein the user input selects an object within the open application;
code that receives data associated with the selected object, wherein the data associated with the selected object is based upon the additional code embedded within the open application and identifies the selected object; and
code that sends data associated with the selected object to an application selected from the group consisting of: the open application and another application.

\* \* \* \* \*